UNITED STATES PATENT OFFICE 2,405,607

COMPOUNDED LUBRICANT

Dilworth T. Rogers, Plainfield, N. J., assignor to Standard Oil Development Company, a corporation of Delaware No Drawing. Application March 31, 1944, Serial No. 528,952

9 Claims. (Cl. 252—46.7)

This invention relates to a method of preventing the deterioration of organic materials, and it relates more particularly to a new type of additive for improving the properties of mineral lubricating oils.

In co-pending application Serial Number 457,146, filed September 3, 1942, the same being a joint application of Carl Winning and the present applicant, there were described additives for lubricating oils which were prepared by reacting an unsaturated compound, such as diisobutylene, with a sulfur halide and further reacting the product thus formed with an aromatic compound, e. g., phenol. These products were shown to have the property of notably reducing the corrosion of copper-lead and similar bearings when blended into lubricating oils, and of notably improving engine cleanliness and reducing ring sticking, piston skirt varnish formation and the sludging tendencies of oils used in automotive engines. The products were also found to be useful as general antioxidants for organic materials.

It has now been found, in accordance with the present invention, that when products of the type described in application Serial Number 457,146 are further reacted with a combination of the elements phosphorus and sulfur, either in the form of a mixture of elemental phosphorus and elemental sulfur or, more preferably, a phosphorus sulfide, the resulting products, as well as metallic and organic base salts of the same, have properties which are notably superior to those shown to be possessed by the products before reacting with the phosphorus and sulfur, particularly with regard to their effectiveness as blending agents for mineral lubricating oils, since they are distinctly superior in the property of reducing the corrosion of alloy bearings and in promoting engine cleanliness. Furthermore, because of their sulfur and phosphorus content, they are very effective extreme pressure agents.

The preparation and uses of the various salts of the new products are described and claimed in my co-pending application of even filing date.

The preparation of the new additives of the present invention thus involves three fundamental steps: (1) the reaction of an unsaturated organic compound with a sulfur halide; (2) a further reaction with an aromatic compound; and (3) a further reaction with phosphorus and sulfur. As pointed out in application Serial Number 457,146, one of the functions of the aromatic material is to stabilize the sulfur present in the reaction product of the sulfur halide with the unsaturated compound. Although all or a greater part of the halogen present is removed by the second reaction as hydrogen halide, the aromatic compound does not act solely as a dehydrohalogenating agent, since an appreciable proportion of the same actually enters into the reaction and becomes a constituent of the reaction product. The resulting material is a mixture of compounds, some of which are believed to possess an aromatic ring structure with a side chain containing sulfur in a stabilized form. Although the structure of the materials obtained in the third step is not definitely known, the final products of the present invention do contain combined phosphorus, which enhances their desirable properties, and it is believed that organo substituted thio acids of phosphorus are present. It is not intended that the invention be limited by any theory as to the exact nature of the chemical reactions that take place or as to any particular chemical structure of the final products.

In the first reaction of the process any sulfur halide may be reacted with a compound containing one or more unsaturated carbon-to-carbon linkages, e. g., a C=C group or a C≡C group, which forms a part of a non-benzenoid organic group. By the term "non-benzenoid" is meant any organic group other than a ring structure having the typical benzene-like linkages found in benzene and its homologs and in condensed structures such as those of naphthalene, anthracene and the like. The desired reactive unsaturated linkages may be found in many types of grouping, such as in olefins, in olefinic side chains of aromatic compounds, in cyclo-olefins, in terpenes, in hetercyclic compounds, etc. Thus, amylene, isobutylene, diisobutylene, triisobutylene, the codimer of isobutylene and normal butene, cracked gasoline fractions, cracked paraffin wax, medium or high molecular weight polybutene or other viscous olefin polymers, cyclopentene, cyclohexene, butadiene, pentadiene, isoprene, oleic acid, styrene, oleyl alcohol, pine oil, terpenes and similar unsaturated materials may be used. Olefins of less than four carbon atoms are in general not considered particularly suitable for the present invention, although it is not intended that their use be excluded. Derivatives of the above described compounds containing various substituent groups and atoms may also be used to advantage, since the substituent groups normally do not interfere with the principal reaction.

The most suitable sulfur halides are sulfur dichloride and monochloride, especially the monochloride. The olefinic material and sulfur halide may be reacted in any desired proportions, but the more preferred ratio of olefinic material to sulfur halide is within the range from about 3:1 to 1:1 (molal ratio). Higher ratios may often be used when a portion of the olefinic material is to serve as a solvent to be removed later as unreacted material. The temperatures which have been found most satisfactory for this reaction are from about 20° to about 50° C. (about 70–125° F.), but the method may be carried out at considerably higher or lower temperatures if desired. Catalysts are not required.

In the second reaction of the process, in which the reaction product of the sulfur halide with an olefin or like material is further reacted with an aromatic compound, the ratio of about one part by weight of aromatic material to one-half to ten parts by weight of sulfur halide-olefin reaction product may be used. When the aromatic material is a phenol, the most preferred ratio is about one part by weight of the phenol to three to ten parts by weight of the sulfur halide-olefin reaction product. In reacting phenol itself with the diisobutylene-sulfur monochloride condensate the most desirable ratio is about one part of phenol to eight to ten parts of the condensate. The temperature of the reaction may range from about 40° to about 160° C. (about 100°–320° F.), but the most desirable range has been found to be between about 80° and about 140° C. (about 175–285° F.).

In general, solvents are not required in either the first or second steps of the process because of the nature of the reactants employed. For example, when diisobutylene is used as the olefin source, any excess of this which is present undoubtedly acts in a solvent capacity. Where an olefinic material of higher molecular weight is used or where the reaction mixture is not sufficiently fluid the reaction may be aided by the use of an organic solvent such as a chlorinated hydrocarbon or the like. Also, with some types of reactants the presence of water, an alcohol or an ether will be found to be beneficial.

The aromatic materials which may be used in the process include all types. The aromatic hydrocarbons, such as benzene, naphthalene, amyl benzene, wax alkylated naphthalene and the like, may be used, although compounds containing substituent groups, such as phenols, aniline, salicylic acid, substituted salicylic acids, alpha naphthol, diphenyl oxide, etc., are more readily reacted. In such substituted compounds, however, there must always be present in the aromatic nucleus at least one replaceable hydrogen atom. When unsubstituted hydrocarbons, particularly those having no alkyl groups, are employed, a condensing agent, such as aluminum chloride, stannic chloride or the like, is usually necessary. In the case of more active compounds no catalyst is needed.

A preferred group of aromatic compounds for use in accordance with the present invention are the phenols. These may be reacted with the sulfur halide-olefinic reaction product without the use of a catalyst, and the products of reaction are particularly useful in improving the properties of lubricating oils. The more desirable and readily obtainable types of phenols and related compounds are phenol itself and its alkylated derivatives, such as the cresols, xylenols, mesitol, butyl phenol, tert.-amyl phenol, di-tert.-amyl phenol, tert.-octyl phenol, cetyl phenol, cashew nut shell phenol (cardanol), wax alkylated phenols, phenyl phenol, petroleum phenols, and the like, as well as the naphthols. Derivatives of such phenols containing substituents, such as halogen, nitro groups, amino groups, keto groups, carboxyl groups, ester groups, aroxy groups, etc., may also be used, as well as the corresponding thiophenols and compounds having more than one hydroxyl or mercaptan group attached to the aromatic nucleus. Likewise, metal salts of the phenolic compounds may be employed.

It may be mentioned that the chlorophenols and chlorinated aromatic hydrocarbons are particularly valuable in forming compounds useful in extreme pressure lubricants.

Another particularly preferred class of aromatic compounds are the arylamines, such as aniline, diphenylamine, phenylenediamine, aminophenols and the like. These are particularly useful because of the additional antioxidant properties imparted by the attached amino groups.

Aromatic compounds containing other substituent groups are also contemplated for use in accordance with this invention. These include compounds containing aryl, nitro, nitroso, nitrile, thiocyanate, aldehyde, carboxyl and ether groups, as well as groups containing sulfur which partially or wholly replaces the oxygen of these groups. Included also are compounds in which a metal is present, as in a metal carboxylate group, an organo-metallic group, a metal alcoholate group, or the like.

Another particularly preferred class or aromatic compounds which may be reacted with the sulfur halide-olefinic reaction products to produce unusually valuable addition agents are the aromatic sulfides, particularly the phenol sulfides in which two groups are combined with one or more sulfur atoms. The phenol sulfides are conveniently prepared by reacting phenols or alkylated phenols with sulfur halides. Such materials are known to be useful in themselves as anticorrosion agents, and their usefulness is increased by reacting them or their metal salts with the sulfur halide product of the present invention to form products containing additional sulfur in stabilized form and further reacting these products with a phosphorus sulfide.

If desired, the products, after the reaction with the aromatic compound as described above, may be further treated before reacting with a phosphorus sulfide or with phosphorus and sulfur. For example, those obtained by reaction with phenols or with phenol sulfides may be converted to metal salts, such as those of tin, barium, calcium, magnesium, zinc, nickel or aluminum, and the metal derivatives thus formed further reacted with a phosphorus sulfide to form lubricating oil additives. Likewise, any free phenolic groups present may be converted to ester or ether groups.

In the final step of the process the products of the foregoing reactions are further reacted with the elements phosphorus and sulfur. This may be accomplished by adding a mixture of the substances in elementary form to the heated reaction products, or by adding a sulfide of phosphorus, such as $P_2S_3$, $P_2S_5$, $P_4S_3$, $P_4S_7$, or the like, or by treating with a mixture of sulfur and/or phosphorus and a sulfide of phosphorus, or by treating with any other substance or substances containing essentially only the elements phosphorus and sulfur or phosphorus and sulfur in combination with elements which do not interfere with the reaction and which are not harmful to the final product. When elementary phosphorus is used it may be used either in the white (yellow) or red allotropic form, and sulfur may likewise be used in any of its allotropic forms.

However, it is ordinarily more convenient to use a sulfide of phosphorus in carrying out the reaction. The proportion of phosphorus sulfide to the sulfur halide-olefin-aromatic condensate may vary over a considerable range. In general about 5 to 25 per cent. and preferably about 8 to 15 per cent. of phosphorus sulfide is used, based on the weight of the product from the previous condensation of aromatic material with the sulfur halide treated olefinic material.

Although the reaction can be brought about by fusing the phosphorus and sulfur or phosphorus sulfide with the above described reaction product, it is more convenient to carry out the reaction with the aid of solvents, particularly petroleum hydrocarbon solvents, or by the use of an excess of the olefinic reaction product when the entire series of reactions take place in one reaction vessel. Chlorinated or aromatic solvents may also be used. In the reaction with sulfide of phosphorus, temperatures in the range of 60 to 200° C. may be employed, but temperatures of 90 to 150° C. are preferred.

If desired, the reaction with the sulfide of phosphorus may be conducted in a lubricating oil medium. For example, a 50% concentrate of the olefin-sulfur halide-aromatic condensate may be prepared in lubricating oil as described in Example 1 of the aforementioned copending application Serial Number 457,146, and then treated with the sulfide of phosphorus and finally filtered.

In general, the preferred method of conducting the reactions of the present invention is first to treat the olefin or other unsaturated material with the sulfur halide, then react with the aromatic material, and finally add the phosphorus sulfide. However, variations of this procedure may be employed, as by adding the sulfur halide to a mixture of the olefin and aromatic material, provided the olefin and aromatic material do not react directly with each other, and then further reacting with the phosphorus sulfide.

It is to be understood that any of the products disclosed in or prepared by the methods described in application Serial Number 457,146 may be further reacted with a combination of phosphorus and sulfur to form the lubricating oil additives of the present invention.

Useful products, especially adapted for use in extreme pressure lubricants, may be prepared by halogenating the phosphorus sulfide reaction products; or, the halogen may be introduced by using compounds containing phosphorus, sulfur and halogen, e. g., $PSCl_3$, $PSBr_3$, $PSBrCl_2$, $P_2S_3Br_4$ and the like, in place of or in addition to the phosphorus sulfide in the final step of the preparation.

As noted above and as will be demonstrated below, the additives of the present invention are particularly useful for reducing corrosiveness of oils toward alloy bearings and for improving engine cleanliness as indicated by the reduced quantities of deposits found in ring grooves, on piston skirts and in other parts of the engine in which the additive compounded lubricants are used.

Another noteworthy advantage of the additives prepared in accordance with the present invention is their ability to reduce exhaust valve sticking in engine operation. In certain types of service, such as in railway Diesel engines, oils of otherwise satisfactory characteristics are often objectionable because of their tendency to cause sticking or erratic action of the exhaust valves, presumably through the building up of oil decomposition products on the hot portions of the valve stems. Additives of the present invention markedly retard this tendency in oils in which they are blended. Since fuel combustion products also come into contact with the valve parts, the additives may likewise be added to the fuels for both Diesel and gasoline engines to prevent or minimize the sticking of valves.

Generally, the additives of the present invention are most advantageously blended with lubricating oil base stocks in concentrations between the approximate limits of 0.02% and 5.0%, and preferably from 0.1% to 2.0%, although larger amounts may be employed. The exact amount to be used depends to a certain extent on the particular compounds used, the character of the mineral oil base and the operating conditions of the engine in which the lubricant is to be employed. When the additives are to be used in extreme pressure lubricants, concentrations of 1 to 15% are desirable and concentrations of 2 to 10% are preferred.

Concentrates of the additives in oil may also be prepared in, say, 25% to 75% concentration of additive and the concentrate later blended with other oils to give a final blend of lubricating oil containing the desired percentage of additive. Such concentrates are often desirable to save shipping weight and space and to facilitate blending operations.

Numerous examples of the preparation and utilization of useful products in accordance with the method of the present invention will be described in the examples which follow, but it is to be understood that these examples do not limit the scope of the invention in any way.

EXAMPLE 1

3700 grams of diisobutylene was placed in a 12 liter, 3-neck round bottom flask equipped with a heater, stirrer and reflux condenser. Then, over a four hour period, 1417 grams $S_2Cl_2$ was added with stirring, the reaction temperature being kept at 40 to 45° C. After an additional hour of stirring 280 grams of phenol was added rapidly, the temperature raised to 100° C. and stirring was continued for an additional two hour period. The reaction product was steam distilled until no more diisobutylene distilled over. Separated water was removed from the distillation residue and the latter was dried by heating at 100° C. in a stream of nitrogen under vacuum. A yield of 2411 grams of reaction product was obtained. Its analysis was as follows:

| | Per cent |
|---|---|
| S | 24.33 |
| Cl | 0.60 |
| H | 10.27 |
| C | 64.11 |

EXAMPLE 2

A mixture of 100 grams of the product of Example 1 and 10 grams of $P_2S_5$ was heated on the steam bath for two hours and then filtered through Hy-flo (a diatomaceous earth type filter aid). A light colored product was obtained which had the following analysis:

| | Per cent |
|---|---|
| S | 25.27 |
| Cl | 0.38 |
| P | 0.20 |

EXAMPLE 3

Using the method of Example 1, 1233 grams of diisobutylene was reacted with 472 grams of $S_2Cl_2$ and the product condensed with 94 grams of phenol. The mixture was maintained at a temperature of 100° C. and 71 grams of $P_2S_5$ was added over a 15 minute period. Heating was continued at 100–105° C. for two hours. The product was allowed to cool to room temperature and then filtered through Hy-flo leaving a very slight residue. The filtrate was divided into two equal parts (850 cc. each) and one portion was steam distilled at 100° C. yielding 282 grams of colorless water insoluble distillate. The distillation residue was separated from the water present and then dried in a stream of nitrogen for one hour at 105° C. The final product had the following analysis:

| | Per cent |
|---|---|
| S | 26.94 |
| Cl | 0.52 |
| P | 0.80 |

EXAMPLE 4

A stream of nitrogen was passed through the second portion of the filtrate obtained in Example 3 at 105° C. for one hour, giving a product which was not completely oil-soluble, i. e., a 1% solution in an SAE 20 grade lubricating oil was cloudy. The product was therefore steam distilled for one hour at 100° C. and the steam distillation residue was then found to be oil soluble, a 10% solution in lubricating oil giving no haze. There was obtained 380 grams of product which had the following analysis:

| | Per cent |
|---|---|
| S | 27.23 |
| Cl | 0.66 |
| P | 1.18 |

EXAMPLE 5

Employing the method of Example 1, 1233 parts by weight of diisobutylene was reacted with 472 parts by weight of $S_2Cl_2$ and the product condensed with 188 parts by weight of phenol. Then at 100° C. 142 parts by weight of $P_2S_5$ were added, causing the temperature to rise to 110° C. Heating was continued for two hours at 100° C. and the product was then cooled to room temperature and filtered through Hy-flo, giving practically no filter residue. The filtrate was steam distilled for about three hours at 100° C., yielding 470 parts by weight of water insoluble distillate. Separated water was removed from the still residue and the latter was dried in a stream of nitrogen at 100–105° C., giving 915 parts by weight of a dark red colored product. Its analysis was as follows:

| | Per cent |
|---|---|
| S | 26.44 |
| Cl | 0.40 |
| P | 1.34 |

The product was not completely oil soluble, a 0.5% blend in an SAE 20 grade lubricating oil being slightly hazy.

EXAMPLE 6

A 50% by weight blend of the product from Example 5 in an SAE 20 lubricating oil base was mixed with 2% by weight of Super Filtrol and stirred for ½ hour at 150° F., then filtered with the aid of Hy-flo. The filtrate, when blended with lubricating oil in 1% concentration, gave a clear blend. Analysis of the 50% concentrate product was as follows:

| | Per cent |
|---|---|
| S | 13.19 |
| Cl | 0.19 |
| P | 0.66 |

EXAMPLE 7

A product was prepared according to the method of Example 1, using the same quantities of reactants, except that in drying the residue from the steam distillation step an equal volume of benzol was added and then distilled off at 100° C. to remove water. There was obtained a yield of 26.18 grams of the reaction product, which showed the following analysis:

| | Per cent |
|---|---|
| S | 25.18 |
| Cl | 0.18 |
| H | 10.05 |
| C | 64.34 |

EXAMPLE 8

The effectiveness of the products prepared as described in the foregoing examples in inhibiting the corrosion of a typical lubricating oil toward the surfaces of copper-lead bearings was determined by a test which will be described below. The base oil used was a refined mineral lubricating oil of SAE 20 grade. A blank sample of this oil and samples of the oil containing small quantities of the various additives were submitted to the following corrosion test:

500 cc. of the oil was placed in a glass oxidation tube (13" long and 2⅝" diameter) fitted at the bottom with a ¼" bore air inlet tube perforated to facilitate air distribution. The oxidation tube was then immersed in a heating bath so that the oil temperature was maintained at 325° F. during the test. Two quarter sections of automotive bearings of copper-lead alloy of known weight having a total area of 25 sq. cm. were attached to opposite sides of a stainless steel rod which was then immersed in the test oil and rotated at 600 R. P. M., thus providing sufficient agitation of the sample during the test. Air was then blown through the oil at the rate of 2 cu. ft. per hour. At the end of each four-hour period the bearing surfaces were repolished. Each time the bearings were removed they were washed with naphtha and weighed to determine the amount of loss by corrosion (prior to repolishing). The cumulative weight losses of all the bearings used in a given test at the end of the various four-hour periods are given in Table I. The additive is designated by the number of the example in the present specification in which the additive is described. It will readily be noted that the additives of the present invention are very effective inhibitors of bearing corrosion.

Table I

| Oil | Cumulative bearing weight loss (mg. per 25 sq. cm. surface) | | | | | | | | |
|---|---|---|---|---|---|---|---|---|---|
| | 4 hrs. | 8 hrs. | 12 hrs. | 16 hrs. | 20 hrs. | 24 hrs. | 28 hrs. | 32 hrs. | 36 hrs. |
| Base oil | 5 | 181 | | | | | | | |
| Base oil+0.5% product of Example 1 | 0 | 0 | 0 | 4 | 9 | 32 | 249 | | |
| Base oil+0.5% product of Example 2 | 0 | 0 | 0 | 0 | 6 | 20 | 33 | 71 | 168 |
| Base oil+0.5% product of Example 3 | 0 | 0 | 0 | 0 | 5 | 14 | 27 | 69 | 143 |
| Base oil+0.5% product of Example 4 | 0 | 0 | 0 | 0 | 7 | 18 | 23 | 42 | 64 |
| Base oil+1.0% product of Example 6 [1] | 0 | 0 | 0 | 0 | 10 | 27 | 41 | 64 | 116 |

[1] Blend contained 0.5% of effective additive, the product of Example 6 being a 50% concentrate in oil.

EXAMPLE 9

In the following engine performance tests the base oil consisted of a solvent extracted Mid-Continent paraffinic oil of 46 seconds Saybolt viscosity at 210° F. and 110 V. I., to which had been added about 0.8% of polybutene of about 12,000 molecular weight as a V. I. improver to give a lubricating oil of 125 V. I. and 52 seconds viscosity at 210° F. Samples of the unblended base oil and of blends containing this oil with products of Examples 3 and 7, respectively, were tested in a C. F. R. single cylinder engine, each run being made for 55 hours at 1880 R. P. M., 12.8/1 air/fuel ratio, 200° F. water jacket temperature and 265° F. oil temperature. The engine parts were given demerit ratings by inspecting and weighting according to their relative importance, and an overall rating was calculated from them. It should be noted that the lower the demerit rating the better the engine condition and, hence, the better the oil performed in the engine.

The results of these engine tests are found in Table II. They show that the additives were very effective in reducing engine deposits and in inhibiting the corrosion of the copper-lead bearings.

*Table II*

| Oil | Overall | Combustion chamber | Ring zone | Ring sticking | Sludge | Cu-Pb bearing wt. loss (g./bearing) |
|---|---|---|---|---|---|---|
| Base oil | 2.57 | 4.33 | 2.76 | 2.75 | 2.00 | 1.12 |
| Base oil+0.5% product of Example 7 | 1.66 | 3.00 | 1.91 | 1.13 | 0.50 | 0.46 |
| Base oil+0.5% product of Example 3 | 1.38 | 2.17 | 1.91 | 0.88 | 0.30 | 0.00 |

The products of the present invention may be employed not only in ordinary hydrocarbon lubricating oils but also in the "heavy duty" type of lubricating oils which have been compounded with such detergent type additives as metal soaps, metal petroleum sulfonates, metal phenates, metal alcoholates, metal phenol sulfonates, metal alkyl phenol sulfides, metal organo phosphates, thiophosphates, phosphites and thiophosphites, metal salicylates, metal xanthates and thioxanthates, metal thiocarbamates, reaction products of metal phenates and sulfur, reaction products of metal phenates and phosphorus sulfides, and the like. Thus, the new additives of this invention may be used in lubricating oils containing such addition agents as barium tert.-octyl phenol sulfides, calcium tert.-amyl phenol sulfide, nickel oleate, barium octadecylate, calcium phenyl stearate, zinc diisopropyl salicylate, aluminum naphthenate, calcium cetyl phosphate, barium di-tert.-amyl phenol sulfide, calcium petroleum sulfonate, zinc methyl cyclohexyl thiophosphate, calcium dichlorostearate, etc.

The lubricating oil base stocks of this invention may be straight mineral lubricating oils, or distillates derived from paraffinic, naphthenic, asphaltic or mixed base crudes, or, if desired, various blended oils may be employed as well as residuals, particularly those from which asphaltic constituents have been carefully removed. The oils may be refined by conventional methods using acid, alkali and/or clay or other agents such as aluminum chloride, or they may be extracted oils produced, for example, by solvent extraction with solvents of the type of phenol, sulfur dioxide, furfural, dichloro ethyl ether, propane, nitrobenzene, crotonaldehyde, etc. Hydrogenated oils or white oils may be employed as well as synthetic oils prepared, for example, by the polymerization of olefins or by the reaction of oxides of carbon with hydrogen or by the hydrogenation of coal or its products. In certain instances cracking coal tar fractions and coal tar or shale oil distillates may also be used. Also, for special applications, animal, vegetable or fish oils or their hydrogenated or voltolized products may be employed, either alone or in admixture with mineral oils.

For the best results the base stock chosen should normally be that oil which without the new additives present gives the optimum performance in the service contemplated. However, since one advantage of the additives is that their use also makes feasible the employment of less satisfactory mineral oils or other oils, no strict rule can be laid down for the choice of the base stock. Certain essentials must of course be observed. The oil must possess the viscosity and volatility characteristics known to be required for the service contemplated. The oil must be a satisfactory solvent for the additive, although in some cases auxiliary solvent agents may be used. The lubricating oils, however they may have been produced, may vary considerably in viscosity and other properties depending upon the particular use for which they are desired, but they usually range from about 40 to 150 seconds Saybolt viscosity at 210° F. For the lubrication of certain low and medium speed Diesel engines the general practice has often been to use a lubricating oil base stock prepared from naphthenic or aromatic crudes and having a Saybolt viscosity at 210° F. of 45 to 90 seconds and a viscosity index of 0 to 50. However, in certain types of Diesel service, particularly with high speed Diesel engines, and in gasoline engine service, oils of higher viscosity index are often required, for example up to 75 or 100, or even higher, viscosity index.

In addition to the materials to be added according to the present invention, other agents may also be used such as dyes, pour depressors, heat thickened fatty oils, sulfurized fatty oils, organo metallic compounds, metallic or other soaps, sludge dispersers, antioxidants, thickeners, viscosity index improvers, oiliness agents, defoaming or antifoaming agents, resins, rubber, olefin polymers, voltolized fats, voltolized mineral oils, and/or voltolized waxes and colloidal solids such as graphite or zinc oxide, etc. Solvents and assisting agents, such as esters, ketones, alcohols, aldehydes, halogenated or nitrated compounds, and the like, may also be employed.

Assisting agents which are particularly desirable are the higher alcohols having eight or more carbon atoms and preferably 12 to 20 carbon atoms. The alcohols may be saturated straight and branched chain aliphatic alcohols such as octyl alcohol, $C_8H_{17}OH$, lauryl alcohol, $C_{12}H_{25}OH$, cetyl alcohol, $C_{16}H_{33}OH$, stearyl alcohol, sometimes referred to as octadecyl alcohol, $C_{18}H_{37}OH$, and the like; the corresponding olefinic alcohols such as oleyl alcohol; cyclic alcohols, such as naphthenic alcohols; and aryl substituted alkyl alcohols, for instance, phenyl octyl alcohol, or octadecyl benzyl alcohol or mixtures of these various alcohols, which may be pure or substantially pure synthetic alcohols. One may also use mixed naturally occurring alcohols such as those found in wool fat (which is known to contain a substantial percentage of alcohols having about 16 to 18 carbon atoms) and in sperm oil (which contains a high percentage of cetyl alcohol); and although it is preferable to isolate the alcohols from those materials, for some purposes, the wool fat, sperm oil or other natural products rich in alcohols may be used per se. Products prepared synthetically by chemical processes may also be used, such as alcohols prepared by the oxidation of petroleum hydrocarbons, e. g., paraffin wax, petrolatum, etc.

In addition to being employed in crankcase lubricants and in extreme pressure lubricants, the additives of the present invention may also be used in spindle oils, textile oils, metal cutting oils, engine flushing oils, turbine oils, insulating and transformer oils, steam cylinder oils, slushing compositions, and greases. Also their use in motor fuels, Diesel fuels and kerosene is contemplated. Since these additives exhibit antioxidant properties and are believed also to possess ability to modify surface activity, they may be employed in asphalts, road oils, waxes, fatty oils of animal or vegetable origin, soaps, and plastics. Similarly, they may be used in natural and synthetic rubber compounding both as vulcanization assistants and as antioxidants, and generally they may be used in any organic materials subject to deterioration by atmospheric oxygen.

The present invention is not to be considered as limited by any of the examples described herein, which are given by way of illustration only, but is to be limited solely by the terms of the appended claims.

I claim:

1. A lubricant comprising a mineral lubricating oil base stock and a small proportion, sufficient to stabilize said oil against deterioration, of a reaction product of a combination of the elements sulfur and phosphorus with a product obtained by reacting a phenol with a sulfur chloride derivative of an olefin.

2. A lubricant comprising a mineral lubricating oil base stock and a small proportion, sufficient to stabilize said oil against deterioration, of a reaction product of a combination of the elements sulfur and phosphorus with a product obtained by reacting phenol with a sulfur monochloride derivative of diisobutylene.

3. A lubricant comprising a mineral lubricating oil base stock and about 0.1% to about 2.0% by weight of a reaction product of a combination of the elements sulfur and phosphorus with a product obtained by reacting about one part by weight of phenol with about eight to ten parts by weight of a sulfur monochloride derivative of diisobutylene.

4. A lubricant comprising a mineral lubricating oil base stock and a small proportion, sufficient to stabilize said oil against deterioration, of a reaction product of a phosphorus sulfide with a product obtained by reacting a phenol with a sulfur chloride derivative of an olefin.

5. A lubricant comprising a mineral lubricating oil base stock and a small proportion, sufficient to stabilize said oil against deterioration, of a reaction product of a phosphorus sulfide with a product obtained by reacting phenol with a sulfur monochloride derivative of diisobutylene.

6. A lubricant comprising a mineral lubricating oil base stock and a small proportion, sufficient to stabilize said oil against deterioration, of a reaction product of phosphorus pentasulfide with a product obtained by reacting a phenol with a sulfur chloride derivative of an olefin.

7. A lubricant comprising a mineral lubricating oil base stock and a small proportion, sufficient to stabilize said oil against deterioration, of a reaction product of phosphorus pentasulfide with a product obtained by reacting phenol with a sulfur monochloride derivative of diisobutylene.

8. An extreme pressure lubricant comprising a mineral lubricating oil base stock and about 2 to about 10% of a reaction product of a phosphorus sulfide with a product obtained by reacting a phenol with a sulfur halide derivative of a compound containing an olefinic linkage.

9. An extreme pressure lubricant comprising a mineral lubricating oil base stock and about 2 to about 10% of a reaction product of a phosphorus sulfide with a product obtained by reacting a chlorophenol with a sulfur halide derivative of an olefin.

DILWORTH T. ROGERS.